(12) United States Patent
Jaitly et al.

(10) Patent No.: US 10,559,300 B2
(45) Date of Patent: *Feb. 11, 2020

(54) GENERATING TARGET SEQUENCES FROM INPUT SEQUENCES USING PARTIAL CONDITIONING

(71) Applicant: Google LLC, Mountain View, CA (US)

(72) Inventors: Navdeep Jaitly, Mountain View, CA (US); Quoc V. Le, Sunnyvale, CA (US); Oriol Vinyals, London (GB); Samuel Bengio, Los Altos, CA (US); Ilya Sutskever, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/055,414

(22) Filed: Aug. 6, 2018

(65) Prior Publication Data

US 2018/0342238 A1 Nov. 29, 2018

Related U.S. Application Data

(63) Continuation of application No. 15/349,245, filed on Nov. 11, 2016, now Pat. No. 10,043,512.

(Continued)

(51) Int. Cl.
*G10L 15/00* (2013.01)
*G10L 15/16* (2006.01)
(Continued)

(52) U.S. Cl.
CPC ............ *G10L 15/16* (2013.01); *G05B 13/027* (2013.01); *G06F 17/276* (2013.01);
(Continued)

(58) Field of Classification Search
USPC .................................. 704/231–257, 270–275
See application file for complete search history.

(56) References Cited

U.S. PATENT DOCUMENTS 6,208,963 B1 3/2001 Martinez
9,141,916 B1 9/2015 Corrado
(Continued)

OTHER PUBLICATIONS

Bahdanau et al., "End-to-end attention-based large vocabulary speech recognition," 2016 IEEE International Conference on Acoustics, Speech and Signal Processing (ICASSP). IEEE, 2016, 8 pages.
(Continued)

*Primary Examiner* — Jesse S Pullias
(74) *Attorney, Agent, or Firm* — Fish & Richardson P.C.

(57) ABSTRACT

A system can be configured to perform tasks such as converting recorded speech to a sequence of phonemes that represent the speech, converting an input sequence of graphemes into a target sequence of phonemes, translating an input sequence of words in one language into a corresponding sequence of words in another language, or predicting a target sequence of words that follow an input sequence of words in a language (e.g., a language model). In a speech recognizer, the RNN system may be used to convert speech to a target sequence of phonemes in real-time so that a transcription of the speech can be generated and presented to a user, even before the user has completed uttering the entire speech input.

20 Claims, 5 Drawing Sheets

Related U.S. Application Data

(60) Provisional application No. 62/254,687, filed on Nov. 12, 2015.

(51) Int. Cl.
    *G06N 3/04*         (2006.01)
    *G06F 17/27*       (2006.01)
    *G10L 15/26*       (2006.01)
    *G06F 17/28*       (2006.01)
    *G10L 15/02*       (2006.01)
    *G05B 13/02*       (2006.01)

(52) U.S. Cl.
    CPC ......... *G06F 17/289* (2013.01); *G06N 3/0445* (2013.01); *G10L 15/02* (2013.01); *G10L 15/26* (2013.01); *G10L 2015/025* (2013.01)

(56) References Cited

U.S. PATENT DOCUMENTS

| | | | |
|---|---|---|---|
| 9,263,036 | B1 | 2/2016 | Graves |
| 9,620,108 | B2 | 4/2017 | Sak |
| 10,043,512 | B2 * | 8/2018 | Jaitly ...................... G10L 15/26 |
| 2014/0279774 | A1 | 9/2014 | Wang |
| 2017/0103752 | A1 | 4/2017 | Senior |

OTHER PUBLICATIONS

Bahdanau et al., "Neural Machine Translation by Jointly Learning to Align and Translate," arXiv preprint arXiv:1409.0473, 2014, 15 pages.

Bengio et al., "Scheduled Sampling for Sequence Prediction with Recurrent Neural Networks," Advances in Neural Information Processing Systems, 2015, 9 pages.

Chan et al., "Listen, attend and spell," arXiv preprint arXiv:1508.01211, 2015, 16 pages.

Cho et al., "Learning Phrase Representations using RNN Encoder-Decoder for Statistical Machine Translation," arXiv preprint arXiv:1406.1078, 2014, 15 pages.

Chorowski et al., "Attention-Based Models for Speech Recognition," Advances in Neural Information Processing Systems, 2015, 19 pages.

Chorowski et al., "End-to-end Continuous Speech Recognition using Attention-based Recurrent NN: First Results," arXiv preprint arXiv:1412.1602, 2014, 10 pages.

Goldberg. "A Primer on Neural Network Models for Natural Language Processing," Draft Copy as of Oct. 5, 2015, [retrieved on May 20, 2016], retrieved from Internet URL<http://u.cs.biu.ac.il/~yogo/nnlp.pdf> 76 pages.

Graves et al., "Speech recognition with deep recurrent neural networks," 2013 IEEE international conference on acoustics, speech and signal processing. IEEE, 2013, 5 pages.

Graves, Alex, "Sequence transduction with recurrent neural networks," arXiv preprint arXiv:1211.3711, 2012, 9 pages.

Hochreiter and Schmidhuber, "Long Short-Term Memory," Neural Computation, Nov. 1997, 9(8):1735-1780.

International Preliminary Report on Patentability issued in International Application No. PCT/US2016/061597, dated May 24, 2018, 8 pages.

International Search Report and Written Opinion issued in International Application No. PCT/US2016/061597, dated Feb. 17, 2017, 12 pages.

Luo et al. "Learning Online Alignments with Continuous Rewards Policy Gradient," arXiv preprint arXiv:1608.01281, 2016, 9 pages.

Schuster and Paliwal, "Bidirectional recurrent neural networks," Signal Processing, IEEE Transactions on, Nov. 1997, 45(11):2673-2681.

Starzyk et al. "Spatio-Temporal Memories for Machine Learning: A Long-Term Memory Organization," IEEE Transactions on Neural Networks, vol. 20 (5), May 1, 2009, 13 pages.

Sutskever et al., "Sequence to Sequence Learning with Neural Networks," Advances in neural information processing systems. 2014, 9 pages.

Yu et al., "Online Segment to Segment Neural Transduction," arXiv preprint arXiv:1609.08194, 2016, 10 pages.

\* cited by examiner

GENERATING TARGET SEQUENCES FROM INPUT SEQUENCES USING PARTIAL CONDITIONING

CROSS-REFERENCE TO RELATED APPLICATION

This application claims priority to U.S. Provisional Application No. 62/254,687, filed on Nov. 12, 2015. The disclosure of the prior application is considered part of and is incorporated by reference in its entirety in the disclosure of this application.

TECHNICAL FIELD

This specification generally relates to systems, methods, devices, and other techniques for generating representations of input sequences using neural networks.

BACKGROUND

Many data processing tasks involve converting an ordered sequence of inputs into an ordered sequence of outputs. For example, machine translation systems translate an input sequence of words in one language into a sequence of words in another language. As another example, pronunciation systems convert an input sequence of graphemes into a target sequence of phonemes.

SUMMARY

This specification describes a system implemented as computer programs on one or more computers in one or more locations.

The system is a system for generating a target sequence that includes a respective output at each of multiple output time steps from an input sequence that includes a respective input at each of multiple input time steps.

In particular, the system can be used for online sequence transduction because the system selects the current output in the target sequence conditioned on the partial input sequence observed, i.e., rather on the entire input sequence, and the partial target sequence generated so far.

More specifically, for each block consisting of a fixed number of input time steps in the input sequence, the system processes each input in the block of input time steps using an encoder recurrent neural network (RNN) to generate a respective feature representation of the input. The system then processes the feature representations for the inputs in the block and a preceding output at a preceding output time step using a transducer RNN to select a respective output for each of one or more output time steps immediately following the preceding output time step. Thus, the system can use the transducer RNN to begin selecting outputs for the target sequence before the encoder RNN has generated the feature representations for all of the inputs in the input sequence.

Embodiments of the subject matter described herein may optionally include one or more of the following features.

For the initial block in the input sequence, the preceding output at the preceding output time step can be a placeholder start-of-sequence output.

Processing the feature representations for the inputs in the block and a preceding output at a preceding output time step using a transducer RNN to select a respective output for each of one or more output time steps immediately following the preceding output time step can include selecting outputs until the selected output is a designated end-of-block output.

Processing the feature representations for the inputs in the block and the preceding output at a preceding output time step using the transducer RNN can include processing the feature representations for the inputs in the block and the preceding output using the transducer RNN to select a current output for a current output time step immediately following the preceding output time step. When the current output is the designated end-of-block output, the system can refrain from generating any more outputs for the block. When the current output is not the designated end-of-block output, the system can process the feature representations for the inputs in the block and the current output using the transducer RNN to select a next output for a next output time step immediately following the current output time step.

Processing the feature representations for the inputs in the block and a preceding output at a preceding output time step using a transducer RNN to select a respective output for each of one or more output time steps immediately following the preceding output time step can include selecting outputs until a designation portion of an intermediate output of the transducer RNN indicates that the selected output is the last in the block.

The transducer RNN can be configured to, for a given block of input time steps and to select an output for a given output time step, (i) process the output at an output time step immediately preceding the given output time step and a preceding context vector for the output time step immediately preceding the given output time step using a first RNN subnetwork to update a current hidden state of the first RNN subnetwork, (ii) process the updated hidden state of the first RNN subnetwork and the feature representations for the inputs in the given block of input time steps using a context subnetwork to determine a current context vector, (iii) process the current context vector and the updated hidden state of the first RNN subnetwork using a second RNN subnetwork to update a current hidden state of the second RNN subnetwork, and (iv) process the current hidden state of the second RNN subnetwork using a softmax layer to generate a respective score for each output in a dictionary of possible outputs.

The context subnetwork can be a recurrent neural network.

The input sequence can be a speech sequence in a first language and the target sequence can be a sequence of phonemes that represent the speech sequence, in either the first language or a different second language.

The input sequence can be a speech sequence in a first language and the target sequence can be a sequence of words or characters that represent the speech sequence, in either the first language or a different second language.

In some embodiments, a computer program comprises instructions that when executed by computing apparatus causes it to perform any of the above methods.

In some embodiments, a computer storage medium may be encoded with instructions that, when executed by one or more computers, cause the one or more computers to perform operations for generating a target sequence that includes a respective output at each of multiple output time steps from an input sequence that includes a respective input at each of multiple input time steps. The operations can include, for example, any of the foregoing operations described in this section.

In some embodiments, a system that includes one or more computers and one or more storage devices may store instructions that are operable, when executed by the one or more computers, to cause the one or more computers to perform operations for generating a target that includes a respective output at each of multiple output time steps from an input sequence that includes an respective input at each of multiple input time steps. The operations can include, for example, any of the foregoing operations described in this section.

DESCRIPTION OF DRAWINGS

Like references and identifiers among the various drawings indicate like elements.

DETAILED DESCRIPTION

This document generally describes systems, methods, devices, and other techniques for using a recurrent neural network (RNN) system to generate a target sequence of outputs from an input sequence of inputs. The input sequence can include a respective input at each of a series of input time steps and the target sequence of outputs can include a respective output at each of a series of output time steps. The system can be configured to perform tasks such as converting recorded speech to a sequence of phonemes that represent the speech, converting an input sequence of graphemes into a target sequence of phonemes, translating an input sequence of words in one language into a corresponding sequence of words or characters in another language, converting recorded speech into a translated sequence of words or characters in another language, or predicting a target sequence of words that follow an input sequence of words in a language (e.g., a language model).

More particularly, this document describes how the system may select an output at a current time step in the target sequence conditioned on only a portion of the input sequence, e.g., the portion of the input sequence that has been observed thus far, and further conditioned on the portion of the target sequence that has been generated thus far. Accordingly, the system may be suitable for performing online tasks in which outputs are provided before the entire input sequence has been observed. For instance, in a speech recognizer, the RNN system may be used to convert speech to a target sequence of phonemes in real-time so that a transcription of the speech can be generated and presented to a user, even before the user has completed uttering the entire speech input.

Figure 1:
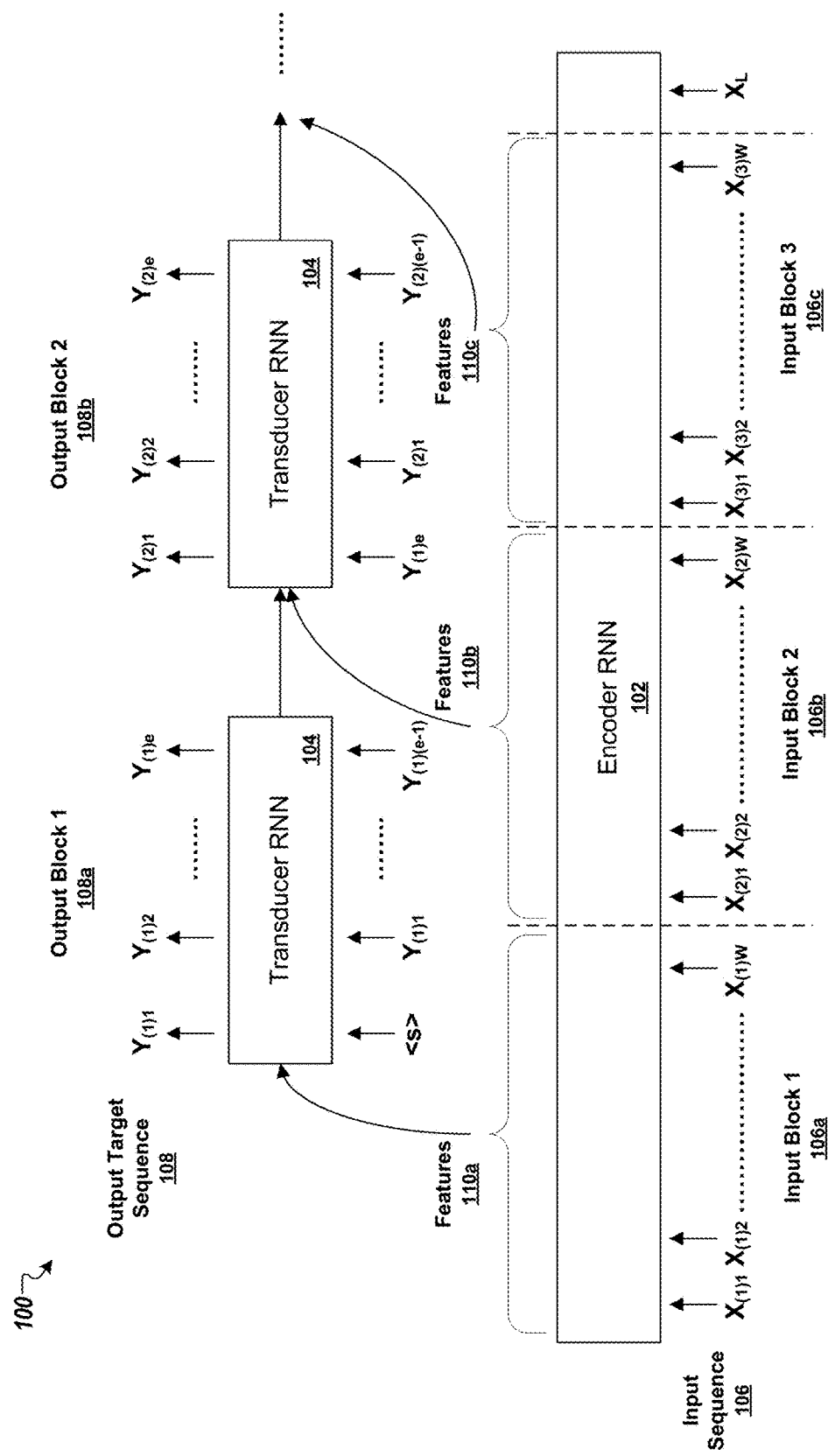
FIG. 1 is a conceptual diagram of a recurrent neural network system that generates a respective portion of an output sequence for each block of input time steps of an input sequence.

Referring to FIG. 1, a conceptual diagram is shown of an RNN system 100 processing an input sequence 106 to generate a target output sequence 108 using partial conditioning on blocks of inputs observed up to a current time step (e.g., rather than conditioning on the entire input sequence before beginning to select outputs for the target sequence).

The RNN system 100 can be implemented as one or more computer programs on one or more computers in one or more locations. The RNN system 100 includes an encoder RNN 102 and a transducer RNN 104. Both the encoder RNN 102 and the transducer RNN 104 are neural networks, and in particular, are recurrent neural networks (RNNs).

Neural networks are machine-learning models that employ one or more layers of nonlinear units to predict an output for a received input. Some neural networks include one or more hidden layers in addition to an output layer. The output of each hidden layer is used as input to one or more other layers in the network, e.g., the next hidden layer or the output layer. Each layer of the network generates an output from a received input in accordance with current values of a respective set of parameters.

RNNs, such as encoder RNN 102 and transducer RNN 104, are neural networks that are configured to receive an input sequence and generate an output sequence from the input sequence. An RNN can use some or all of the internal state of the network from a previous time step in computing an output at a current time step. AN example of an RNN is a long short-term (LSTM) neural network.

The RNN system 100 generates the target output sequence 108 from blocks of inputs of input sequence 106. Each block of inputs represents a respective portion of the entire input sequence 106. In particular, each block consists of inputs at a set of successive time steps of the input sequence 106. Generally, the blocks of input are non-overlapping such that each input time step is assigned to only one block. For example, three blocks 106a, 106b, and 106c are depicted in FIG. 1. The first input block 106a includes inputs for a first set of inputs of the input sequence 106, i.e., inputs $X_{(1)1}$ through $X_{(1)W}$; the second input block 106b includes inputs for a next set of inputs of the input sequence 106 that immediately follow the first set of inputs, i.e., inputs $X_{(2)1}$ through $X_{(2)W}$; and the third input block 106c includes inputs for yet another set of inputs of the input sequence 106 that immediately follow the second set of inputs, i.e., inputs $X_{(3)1}$ through $X_{(3)W}$. In some implementations, the number of input time steps in each block of the input sequence 106 is fixed such that all the blocks are of the same length. In other implementations, the lengths of the blocks may not be fixed such that particular blocks of the input sequence 106 have different lengths, e.g., inputs for different numbers of time steps from one or more other blocks of the input sequence 106.

For each block of inputs, the system 100 is configured to process the inputs at each time step in the block using encoder RNN 102. The encoder RNN 102 generates a feature representation for each input in the block, which features are then used by the transducer RNN 104 to generate outputs for the target sequence. In some implementations, the feature representation for a given input is the current hidden state of the encoder 102 that results from processing the input at a current time step. For example, the first input in a block may be processed by the encoder RNN 102 to update the current hidden state of the encoder RNN 102. The system 100 then uses the updated hidden state of the encoder RNN 102 as the feature representation for the first input (e.g., the system may generate a vector of values that characterize the updated hidden state of the encoder 102). Then the second input in the block may be processed by the encoder RNN 102 to again update the current hidden state of the encoder RNN 102. The system 100 uses the most recently updated hidden state of the encoder 102 as the feature representation for the second input. Each additional input in the block is processed in sequence by the encoder RNN 102 in a like manner. Moreover, at each time step of the input sequence, the encoder RNN 102 can, in effect, be conditioned on the inputs from all previous time steps of the input sequence because the system 100 refrains from resetting the hidden state from any preceding time step. For example, the hidden state of the encoder 102 for the first input of each block after the first block carries forward from the updated hidden state that results from processing the last input of an immediately preceding block.

For instance, because the encoder 102 is recurrent, the current hidden state of the encoder 102 at any given time step is conditioned not only on the respective input at the time step, but also on the inputs at one or more (e.g., all) preceding time steps of the input sequence 106. In some implementations, the hidden state of the encoder RNN 102 is partially conditioned on inputs from previous blocks of the input sequence 106. For example, when the encoder RNN 102 processes the first input $X_{(2)1}$ of the second block 106b, the current hidden state of encoder RNN 102 is conditioned on the inputs from the first block 106a. Thus, the hidden state of the encoder 102 is not reset between blocks.

Once the system 100 has generated feature representations for all the inputs in a block, the system 100 uses the transducer RNN 104 to process the feature representations for the inputs and a preceding output at a preceding output time step to select a respective output for each of one or more output time steps immediately following the preceding output time step. For instance, the feature representations 110a for the inputs of the first block 106a can be processed using the transducer RNN 104 to generate a first block 108a of outputs of the target sequence 108. The transducer RNN 104 generates the first block 108a of outputs by conditioning the hidden state of the transducer using the feature representations 110a of the first block 106a of inputs, and computes the output at each output time step in the first output block 108a based on the output of a preceding time step and in accordance with the current hidden state of the transducer 104. In some implementations, the output $Y_{(1)1}$ at the first time step of the target sequence 108 may be generated using the feature representations 110a for the inputs of the first block 106a and a placeholder start-of-sequence token <s> (e.g., rather than using a preceding output, since no preceding output is available). Each subsequent output $Y_{(1)2}$ through $Y_{(1)e}$ for the time steps in the first output block 108a can be generated by processing the preceding output in accordance current parameters (i.e., the current hidden state) of the transducer RNN 104, which is updated as a result of the processing at each output time step.

The transducer RNN 104 continues generating additional outputs for a given output block until the system 100 identifies that an end-of-block condition has occurred. The total number of time steps in an output block may not be fixed or pre-defined, and the number of time steps in any two output blocks of the target sequence 108 may be the same or different from each other. Moreover, the number of output time steps in an output block may be the same or different from the number of input time steps of the corresponding input block.

In some implementations, the transducer RNN 104 continues to generate outputs for additional output time steps until the generated output is a designated end-of-block output. If the system 100 identifies that the output for a current time step is the designated end-of-block output, the system 100 refrains from generating any more outputs for the block using the transducer RNN 104. If the system identifies that the output for a current time step is not the designated end-of-block output, the system 100 uses the transducer RNN to select a next output for a next output time step immediately following the current output time step. In other implementations, the transducer RNN 104 continues to generate outputs for additional output time steps until a designation portion of an intermediate output of the transducer RNN 104 indicates that the selected output is the last in the block. For instance, the transducer RNN 104 may produce the intermediate output by applying a logistic function on a hidden state of the transducer RNN 104 or the hidden state of a portion of the transducer RNN 104. The target of the logistic function, i.e., the intermediate output, can be 0 or 1 depending on whether the current step is the last step in the block or not. The system 100 may check the intermediate output at each output time step to determine whether to continue generating outputs for additional time steps for the block.

Accordingly, the system 100 is configured to generate partial output sequences based on a partial input sequence of inputs observed so far. As additional blocks of input are observed, the system 100 processes each block to generate additional outputs that extend the output sequence 108. Thus, the system 100 generates outputs $Y_{1(1)}$ through $Y_{(1)e}$ in the first output block 108a based on inputs from the first input block 106a, and then generates outputs $Y_{(2)1}$ through $Y_{(2)e}$ in the second output block 108b based on inputs from the second input block 106b. However, when the transducer RNN 104 begins processing features 110b of the inputs from the second input block 106b, the hidden state of the transducer RNN 104 is partially conditioned on the hidden state of the transducer 104 from a preceding output time step in the first output block 108a. Moreover, the transducer RNN 104 processes the preceding output $Y_{(1)e}$ from the first output block 108a, in addition to the features of the inputs from the second input block 106b, to generate the first output $Y_{(2)1}$ of the second output block 108b, thereby making the outputs in the second block 108b partially conditioned on the inputs observed thus far and the outputs generated thus far. The system 100 can process subsequent blocks of the input sequence 106 in a like manner to generate additional blocks of the target sequence 108a before the entire input sequence 106 is observed. For instance, a third output block (not shown) can be generated using the transducer RNN 104 by processing features 110c of inputs $X_{(3)1}$ through $X_{(3)w}$ of the third input block 106c and preceding outputs.

In some implementations, system 100 is configured to use the encoder RNN 102 to generate features of inputs at substantially the same rate that inputs for the input sequence 106 are received. The system 100 can then generate and present extensions to the target sequence 108 in real-time as the system 100 continues to receive additional portions of the input sequence 106.

Figure 2:
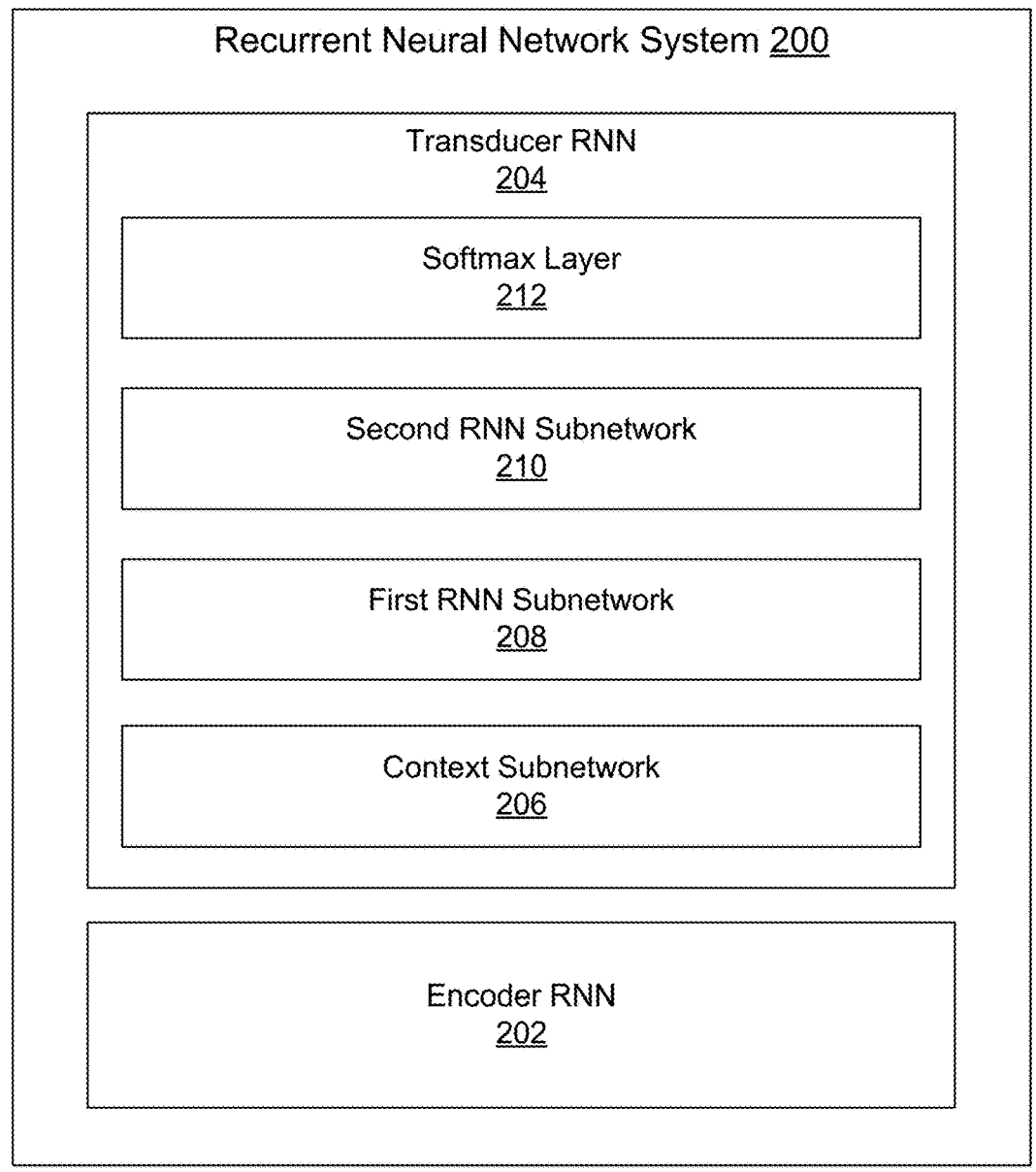
FIG. 2 is a block diagram of an example recurrent neural network system that is configured to perform online sequence-to-sequence transduction using partial conditioning of inputs received and outputs generated thus far.

FIG. 2 depicts an example RNN system 200 for generating target sequences from input sequences. The RNN system 200 includes an encoder RNN 202 and a transducer RNN 204. The transducer RNN 204 includes a context subnetwork 206, a first RNN subnetwork 208, a second RNN subnetwork 210, and a softmax layer 212.

The RNN system 200 is configured to generate blocks of outputs as additional blocks of inputs are observed. The system 200 generates outputs for each block of input by using transducer RNN 204 that generates local extensions to an output target sequence, conditioned on the features computed for the block of inputs by the encoder RNN 202 and the recurrent state of the transducer RNN 204 at the last step of the previous block. The transducer RNN 204 maintains its state across blocks of input through the use of recurrent connections to the previous time steps and blocks. Conditioning over the history of outputs produced in a given block is achieved by processing at each time step the respective output of the immediately preceding time step. Conditioning over the entire history of outputs produced so far is achieved by the transducer RNN 204, through the use of its recurrent connections across blocks. Conditioning on the entire partial input seen so far is achieved through the propagation of information through the recurrent states of the encoder RNN 202.

In particular, the encoder RNN 202 is configured to generate a feature representation for each input in a block of inputs. In some implementations, the feature representation for a given input is the updated hidden state of the encoder RNN 202 that results from processing the input.

After the feature representations for the inputs in a block have been produced, the transducer RNN 204 uses the feature representations to generate a block of outputs. More specifically, for a given output time step, the transducer RNN 204 uses the context subnetwork 206, first RNN subnetwork 208, second RNN subnetwork 210, and softmax layer 212 to determine scores for each output in a dictionary of possible outputs. The output for the time step is selected from the dictionary of possible outputs based on the scores (e.g., system 200 selects the output with the highest score as the output for the time step or samples an output from the possible outputs in accordance with their respective scores).

In particular, the context subnetwork 206 processes the feature representations for the inputs in a block of input time steps and an updated hidden state of the first RNN subnetwork 208 to determine a current context vector for a given output time step. The updated hidden state of the first RNN subnetwork 208 is determined by processing the selected output at an output time step that immediately precedes the given output time step and a preceding context vector for the output time step that immediately precedes the given output time step. The system 200 processes the current context vector and the updated hidden state of the first RNN subnetwork 208 using the second RNN subnetwork 210 to update a current hidden state of the second RNN subnetwork 210, and then the system 200 processes the current hidden state of the second RNN subnetwork 210 using the softmax layer 212 to generate the respective score for each output in the dictionary of possible outputs.

Certain operations performed by the transducer RNN 204 for scoring possible outputs for a given output time step m according to parameters θ of transducer RNN 204 are represented by the following sequence of steps:

$$s_m = f_{RNN}(s_{m-1}, [c_{m-1}; y_{m-1}]; \theta) \quad \text{(Equation 1)}$$

$$c_m = f_{context}(s_m, h_{(b-1)W+1} \ldots {}_{bW}; \theta) \quad \text{(Equation 2)}$$

$$h'_m = f_{RNN}(h'_{m-1}, [c_m; s_m]; \theta) \quad \text{(Equation 3)}$$

$$p(y_m | x_1 \ldots {}_{bW}, y_1 \ldots {}_{(m-1)}) = f_{softmax}(y_m; h'_m; \theta) \quad \text{(Equation 4)}$$

In these equations, the variables s, c, h', and y respectively represent the hidden state of first RNN subnetwork 208, the context vector, the hidden state of the second RNN subnetwork 210, and the selected output for the output time step. First, the first RNN subnetwork 210 evaluates the $f_{RNN}$ function to determine the updated hidden state $s_m$ by processing the selected output $y_{m-1}$ from the preceding output time step and the context vector $c_{m-1}$ from the preceding output time step (equation 1). The function $f_{RNN}$ is a recurrent neural network function such as an LSTM, a sigmoid, or tan h RNN.

Second, the context subnetwork 206 evaluates the $f_{context}$ function to determine a context vector for the current output time step by processing the updated hidden state $s_m$ of the first RNN subnetwork 210 and the feature representations $h_{(b-1)W+1} \ldots {}_{bW}$ of inputs in the current input block b (equation 2). The context vector $c_m$ can be computed in two steps—first a normalized attention vector $a_m$ is computed from the state $s_m$ of the first RNN subnetwork 210 and next the feature representations $h_{(b-1)W+1} \ldots {}_{bW}$ of inputs in the current input block b are linearly combined using a and used as the context vector. To compute $a_m$, a multi-layer perceptron computes a scalar value, $e_j^m$ for each pair of transducer states $s_m$ and encoder $h_{(b-1)W+j}$. The attention vector is computed from the scalar values, $e_j^m$, j=1 . . . W, where W is the block size, e.g., the periodicity with which the transducer emits output tokens. This can be formally represented as follows:

$$e_j^m = f_{attention}(s_m, h_{(b-1)W+j}; \theta) \quad \text{(Equation 5)}$$

$$a_m = softmax([e_1^m; e_2^m; \ldots e_W^m]) \quad \text{(Equation 6)}$$

$$c_m = \Sigma_{j=1}^W a_j^m h_{(b-1)W+j} \quad \text{(Equation 7)}$$

Third, the second RNN subnetwork 210 evaluates the $f_{RNN}$ function to determine the updated hidden state $h'_m$ of the second RNN subnetwork 210 by processing the context vector $c_m$ for the current output time step and the updated hidden state $s_m$ of the first RNN subnetwork 208 for the current output time step. The function $f_{RNN}$ is a recurrent neural network function such as an LSTM, a sigmoid, or tan h RNN.

Fourth, the transducer 204 uses the softmax layer 212 to score each possible output $y_m$ in a dictionary of outputs. The score for a given possible output $y_m$ can indicate a probability that the given possible output $y_m$ is the true (desired) output at the current output time step in a target sequence. The score is conditioned on the entire input sequence observed thus far and the partial output sequence generated thus far. The softmax layer 212 generates a softmax distribution by processing the current hidden state of the second RNN subnetwork 210.

In some implementations, the context subnetwork 206 uses the hidden state of the encoder as the context vector $c_m$, thereby avoiding the computational expense of generating on as described in the preceding manner.

Figure 3:
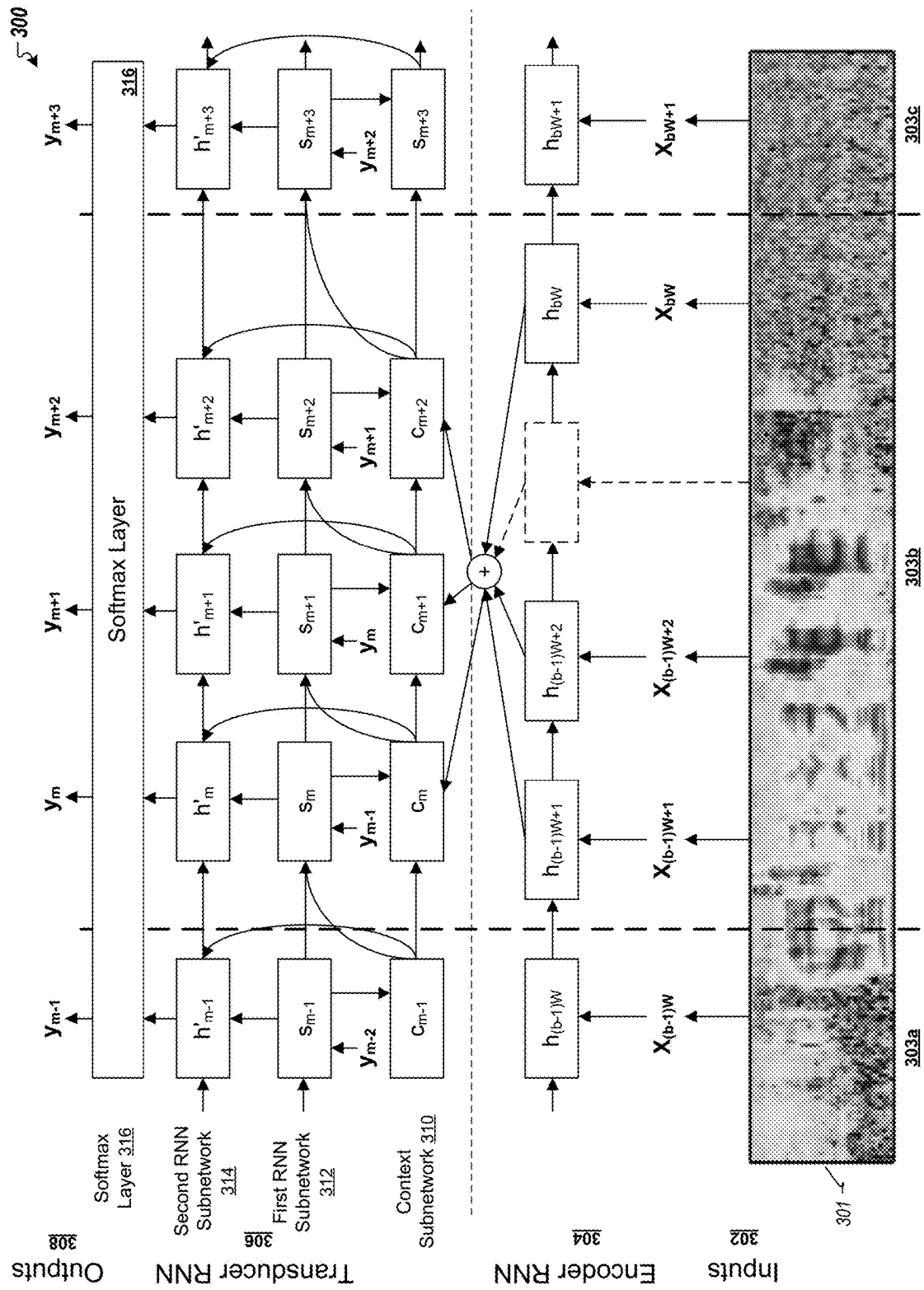
FIG. 3 is a conceptual diagram of a recurrent neural network system performing next-step predictions to generate outputs of a target sequence corresponding to inputs at a block of input time steps.

FIG. 3 is a conceptual diagram of an example RNN system 300 performing next-step predictions to generate a block of outputs for a target sequence. In some implementations, the RNN system 300 is configured in a like manner as the RNN systems 300 described elsewhere in this document, e.g., RNN system 100 (FIG. 1) or RNN system 200 (FIG. 2). In particular, FIG. 3 illustrates how the RNN system may process inputs 302 from a particular block of input time steps 303b to generate outputs for a corresponding block of output time steps. The block of input time steps 303b represents a proper portion of the entire input sequence 302 and the block of output time steps represents a proper portion of the entire output (target) sequence 308.

The RNN system 300 includes an encoder RNN 304 and a transducer RNN 306. The encoder RNN 304 is configured to process inputs from the input sequence 302 and to maintain a hidden state based on recurrent connections within the encoder RNN 304. The system 300 feeds inputs to the encoder RNN 304 in order at each input time step. By way of example, FIG. 3 shows an audio signal 301 of recorded speech, which is sampled to generate input sequence 302. The last input $X_{(b-1)W}$ is shown for the first block of input time steps 303a. Inputs $X_{(b-1)W+1}$ through $X_{bW}$ are shown for the second block of input time steps 303b, and the first input $X_{bW+1}$ is shown for the third block of input time steps 303c.

The hidden state of the encoder 304 at each time step is represented by the blocks labeled h. At each time step, the hidden state h of the encoder 304 is updated by processing the respective input for that time step. For instance, $h_{(b-1)W+1}$ represents the hidden state of the encoder RNN 304 upon processing input $X_{(b-1)W+1}$ and $h_{bW}$ represents the hidden state of the encoder RNN 304 upon processing input $X_{bW}$. Dependencies among inputs across time steps seen by the encoder 304 up to a current time step are achieved by recurrent connections of the encoder RNN 304.

The system 300 processes the respective hidden state of the encoder RNN 304 at each input time step to determine a feature representation for the respective input at the input time step. The system 300 then provides the feature representations of the inputs for the block 303b to the transducer RNN 306 to begin generating outputs 308 corresponding to the input block 303b.

The transducer RNN 306 includes a context subnetwork 310, a first RNN subnetwork 312, a second RNN subnetwork 314, and a softmax layer 316. The context subnetwork 310 processes the feature representations for inputs $X_{(b-1)W+1}$ through $X_{bW}$ to generate context vector c. In some implementations, the context subnetwork 310 further processes the hidden state s of the first RNN subnetwork 312 to generate the context vector c. The hidden state s of the first RNN subnetwork 312 and hidden state h' of the second RNN subnetwork 314 can be partially conditioned on inputs observed thus far and outputs generated thus far based on recurrent connections that are maintained by the transducer RNN across time steps, both within a block of time steps and across blocks of time steps.

For a given output time step, the output y can be selected from a dictionary of possible outputs by (i) processing the output from the immediately preceding time step and the context vector from the immediately preceding time step using the first RNN subnetwork 312 to update the hidden state s of the first RNN subnetwork 312, (ii) processing the feature representations of the inputs from the current block of input time steps and the updated hidden state s of the first RNN subnetwork 312 using the context subnetwork 310 to generate a current context vector c, (iii) processing the current context vector c and the updated hidden state s of the first RNN subnetwork 312 using the second RNN subnetwork 314 to update the hidden state h' of the second RNN subnetwork 314, and (iv) processing the updated hidden state h' of the second RNN subnetwork 314 using the softmax layer 316 to generate a respective score for each output in the dictionary of possible outputs. The output y that the transducer RNN 306 produces at a given time step may be selected from the dictionary of possible outputs based on the scores.

Figure 4:
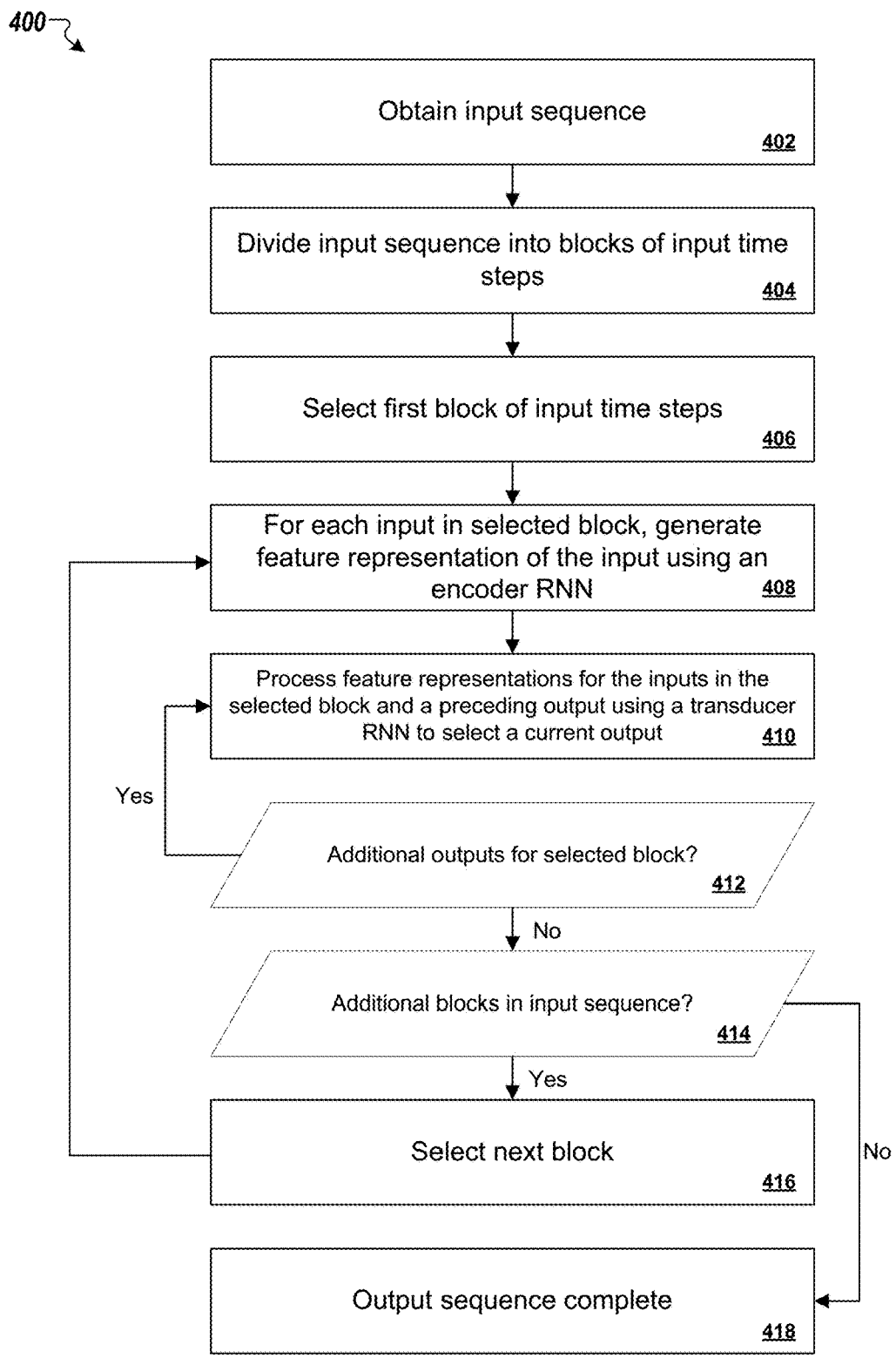
FIG. 4 is a flowchart of an example process for using a recurrent neural network system to process inputs for blocks of input time steps and to generate an output sequence using partial conditioning.

FIG. 4 is a flowchart of an example process 400 for using an RNN system to generate a target output sequence from an input sequence, where the target output sequence includes a respective output for each of a series of output time steps and the input sequence includes a respective input for each of a series of input time steps. In some implementations, the process 400 can be performed by an RNN system in an online context in which partial output sequences are generated before the entire input sequence is observed. The process 400 may be performed, for example, by the RNN systems 100 (FIG. 1), 200 (FIG. 2), or 300 (FIG. 3).

At stage 402, the RNN system begins to obtain an input sequence. The RNN system may receive the input sequence relatively slowly such that the system can process frames of the input sequence as they are received and before the entire sequence is received.

At stage 404, the RNN system divides the input sequence into blocks of input time steps. In some implementations, each block consists of a fixed number W of consecutive time steps. In some implementations, the number of consecutive time steps in a given block may not be fixed, but instead may be dynamically selected based on signals that, e.g., facilitate block alignment with content features (e.g., phonemes, graphemes, words) that are represented by inputs in the input sequence.

At stage 406, the RNN system selects a first block of input time steps to process from the input sequence.

At stage 408, an encoder RNN of the RNN system processes the sequence of inputs from the block of input time steps. The system feeds the inputs from the block to the encoder RNN one at a time in the order that they occur in the input sequence. At each input time step, the encoder RNN processes the respective input and updates the hidden state of the encoder RNN. A feature representation of the respective input can be derived from the updated hidden state of the encoder RNN at each input time step. For example, the feature representation may be formed as a vector of values that characterize the updated hidden state of the encoder RNN.

Figure 5:
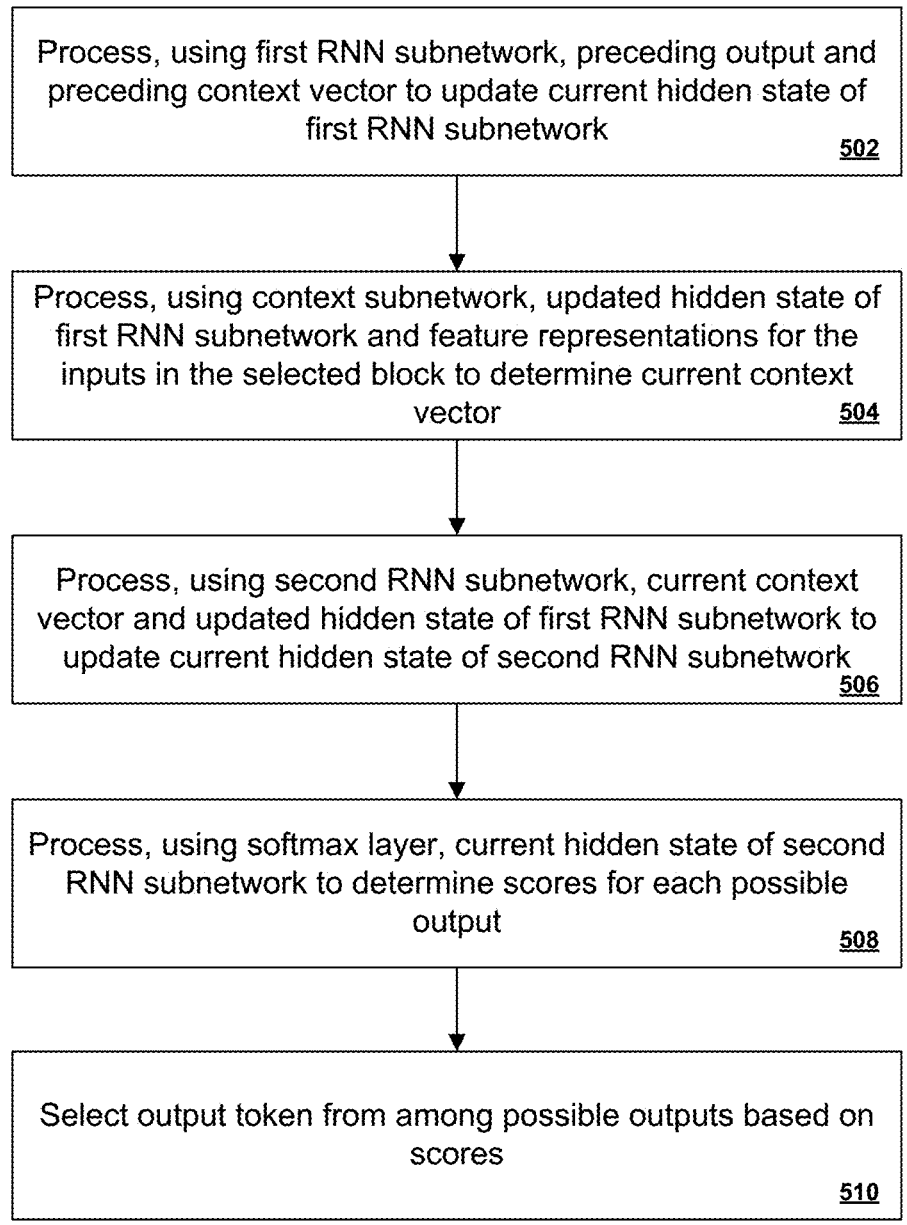
FIG. 5 is a flowchart of an example process for using a transducer RNN to select a current output in an output sequence using partial conditioning on inputs in an input sequence and outputs for one or more preceding time steps in an output sequence.

At stage 410, the RNN system selects a current output from a dictionary of possible outputs for a current output time step in a block of output time steps corresponding to the selected block of input time steps. The selected output can be determined by processing the feature representations of the inputs from the selected block of input time steps and the selected output for the output time step that immediately precedes the current output time step in the target sequence. For the first output time step in a block of output time steps, the transducer RNN processes the feature representations of the inputs from the selected block and the selected output for the last output time step of the preceding block of output time steps. The transducer RNN maintains its state across blocks and across time steps within a given block through the use of recurrent connections to the previous time steps. As such, the selected output for a current time step is further conditioned on the entire portion of the target sequence generated thus far. Additional details concerning the transducer RNN's selection of an output for a given time step is represented in the flowchart of FIG. 5 and discussed below.

At stage 412, the RNN system checks whether additional outputs are to be selected for the current block of output time steps corresponding to the selected block of input time steps. In some implementations, the transducer RNN continues to generate outputs for additional output time steps until the generated output is a designated end-of-block output. In some implementations, the transducer RNN continues to generate outputs for additional output time steps until a designation portion of an intermediate output of the transducer RNN indicates that the selected output is the last in the block.

If the RNN system determines that the current output time step is not the last time step for the current block, then the process 400 advances to a next time step and returns to stage 410 for determination of an output for the next time step. Once the system detects in an iteration that the current output time step is the last time step for the current block (e.g., the system identifies that the output is a designated end-of-block output), then the process advances to stage 414.

At stage 414, the system checks whether additional blocks of input time steps remain to be processed. If additional input blocks remain, then the process 400 advances to stage 416 where the system selects the next block of time steps in the input sequence and then returns to stage 408 to select outputs for the next block of output time steps corresponding to the newly selected block of input time steps. Once no further input blocks remain to be processed, the process 400 proceeds to stage 418 and the output sequence is completed. Thus, the RNN system can perform the process 400 using the transducer RNN to begin selecting outputs for the target sequence before the encoder RNN has generated the feature representations for all of the inputs in the input sequence.

Referring to FIG. 5, a flowchart is shown of an example process 500 for selecting an output for a given output time step of a target sequence using a transducer RNN of an RNN system. In some implementations, the process 500 is performed for each output time step in the target sequence. The process 500 may be performed, for example, by the transducer RNN and RNN systems like those discussed herein, e.g., transducer RNN 104 and RNN system 100 (FIG. 1), transducer RNN 204 and RNN system 200 (FIG. 2), or transducer RNN 306 and RNN system 300 (FIG. 3).

At stage 502, the transducer RNN processes, using a first RNN subnetwork of the transducer RNN, the output for an immediately preceding output time step and a context vector from the immediately preceding output time step to update the current hidden state of the first RNN subnetwork for the current time step.

At stage 504, the transducer RNN processes, using a context subnetwork of the transducer RNN, the updated hidden state of the first RNN subnetwork and feature representations for the inputs of the current block of input time steps to determine an updated context vector for the current output time step.

At stage 506, the transducer RNN processes, using a second RNN subnetwork of the transducer RNN, the updated context vector for the current output time step and the updated hidden state of the first RNN subnetwork for the current output time step to update the hidden state of the second RNN subnetwork.

At stage 508, the transducer RNN processes, using a softmax layer of the transducer RNN, the updated hidden state of the second RNN subnetwork to determine respective scores for each of a set of possible outputs among a dictionary of outputs. The scores may constitute a softmax distribution over the set of possible outputs that represent relative probabilities of each of the possible outputs being the true output for the target sequence at the current output time step.

At stage 510, the system selects an output to emit as the output for the current output time step in the target sequence. The selected output can be selected based on the scores determined at stage 508. In some implementations, the output having the highest score among the determined scores (e.g., a score that indicates the greatest likelihood of the corresponding output being the true output of the target sequence) is selected as the output for the current output time step.

In some implementations, the processes 400 and 500 can be performed for sequences for which the desired output, i.e., the output sequence that should be generated by the system for the input sequence, is not known. The system can also perform the processes 400 and 500 on inputs in a set of training data, e.g., a set of input sequences for which the output sequences that should be predicted by the system is known, in order to train the system, e.g., to determine trained values for the parameters of the layers of the RNN system (e.g., layers of the encoder RNN and transducer RNN) and, optionally, for the mappings of words to word vectors. In particular, the processes 400 and 500 can be performed repeatedly on input sequences selected from a set of training data as part of a conventional machine learning training technique to train the layers of the RNN system, e.g., a stochastic gradient descent with backpropagation through time training technique.

In some implementations, the processes 400 and 500 are performed for converting recorded speech to a sequence of phonemes that represent the speech. In some implementations, the processes 400 and 500 are performed for converting speech to a target sequence of phonemes in real-time so that a transcription of the speech can be generated and presented to a user, even before the user has completed uttering the entire speech input.

In some implementations, the processes 400 and 500 are performed for converting an input sequence of graphemes into a target sequence of phonemes.

In some implementations, the processes 400 and 500 are performed for translating an input sequence of words in one language into a corresponding sequence of words in another language.

In some implementations, the processes 400 and 500 are performed for predicting a target sequence of words that follow an input sequence of words in a language (e.g., a language model).

In some implementations, the encoders discussed herein are convolutional, recurrent, or fully connected deep neural networks.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for generating a target sequence comprising a respective output at each of a plurality of output time steps from an input sequence comprising a respective input at each of a plurality of input time steps, the method comprising:
   for each block of a fixed number of input time steps in the input sequence:
      processing each input in the block of input time steps using an encoder recurrent neural network (RNN) to generate a respective feature representation of the input; and
      processing the feature representations for the inputs in the block and a preceding output at a preceding output time step using a transducer RNN to select a respective output for each of one or more output time steps immediately following the preceding output time step.

2. The method of claim 1, wherein, for the initial block in the input sequence, the preceding output at the preceding output time step is a placeholder start-of-sequence output.

3. The method of claim 1, wherein processing the feature representations for the inputs in the block and a preceding output at a preceding output time step using a transducer RNN to select a respective output for each of one or more output time steps immediately following the preceding output time step comprises selecting outputs until the selected output is a designated end-of-block output.

4. The method of claim 3, wherein processing the feature representations for the inputs in the block and the preceding output at a preceding output time step using the transducer RNN comprises:
   processing the feature representations for the inputs in the block and the preceding output using the transducer RNN to select a current output for a current output time step immediately following the preceding output time step;
   when the current output is the designated end-of-block output, refraining from generating any more outputs for the block; and
   when the current output is not the designated end-of-block output:
      processing the feature representations for the inputs in the block and the current output using the transducer RNN to select a next output for a next output time step immediately following the current output time step.

5. The method of claim 1, wherein processing the feature representations for the inputs in the block and a preceding output at a preceding output time step using a transducer RNN to select a respective output for each of one or more output time steps immediately following the preceding output time step comprises selecting outputs until a designation portion of an intermediate output of the transducer RNN indicates that the selected output is the last in the block.

6. The method of claim 1, wherein the transducer RNN is configured to, for a given block of input time steps and to select an output for a given output time step:
   process the output at an output time step immediately preceding the given output time step and a preceding context vector for the output time step immediately preceding the given output time step using a first RNN subnetwork to update a current hidden state of the first RNN subnetwork;
   process the updated hidden state of the first RNN subnetwork and the feature representations for the inputs in the given block of input time steps using a context subnetwork to determine a current context vector;
   process the current context vector and the updated hidden state of the first RNN subnetwork using a second RNN subnetwork to update a current hidden state of the second RNN subnetwork; and
   process the current hidden state of the second RNN subnetwork using a softmax layer to generate a respective score for each output in a dictionary of possible outputs.

7. The method of claim 6, wherein the context subnetwork is an RNN.

8. The method of any preceding claim, wherein the input sequence is a speech sequence and the target sequence is a sequence of phonemes representing the speech sequence.

9. A system comprising one or more computers and one or more storage devices storing instructions that are operable, when executed by the one or more computers, to cause the one or more computers to perform operations for generating a target sequence comprising a respective output at each of a plurality of output time steps from an input sequence comprising a respective input at each of a plurality of input time steps, the operations comprising:
   for each block of a fixed number of input time steps in the input sequence:
      processing each input in the block of input time steps using an encoder recurrent neural network (RNN) to generate a respective feature representation of the input; and
      processing the feature representations for the inputs in the block and a preceding output at a preceding output time step using a transducer RNN to select a respective output for each of one or more output time steps immediately following the preceding output time step.

10. The system of claim 9, wherein, for the initial block in the input sequence, the preceding output at the preceding output time step is a placeholder start-of-sequence output.

11. The system of claim 9, wherein processing the feature representations for the inputs in the block and a preceding output at a preceding output time step using a transducer RNN to select a respective output for each of one or more output time steps immediately following the preceding output time step comprises selecting outputs until the selected output is a designated end-of-block output.

12. The system of claim 11, wherein processing the feature representations for the inputs in the block and the preceding output at a preceding output time step using the transducer RNN comprises:
   processing the feature representations for the inputs in the block and the preceding output using the transducer RNN to select a current output for a current output time step immediately following the preceding output time step;

when the current output is the designated end-of-block output, refraining from generating any more outputs for the block; and when the current output is not the designated end-of-block output:

processing the feature representations for the inputs in the block and the current output using the transducer RNN to select a next output for a next output time step immediately following the current output time step.

13. The system of claim 9, wherein processing the feature representations for the inputs in the block and a preceding output at a preceding output time step using a transducer RNN to select a respective output for each of one or more output time steps immediately following the preceding output time step comprises selecting outputs until a designation portion of an intermediate output of the transducer RNN indicates that the selected output is the last in the block.

14. The system of claim 9, wherein the transducer RNN is configured to, for a given block of input time steps and to select an output for a given output time step:

process the output at an output time step immediately preceding the given output time step and a preceding context vector for the output time step immediately preceding the given output time step using a first RNN subnetwork to update a current hidden state of the first RNN subnetwork;

process the updated hidden state of the first RNN subnetwork and the feature representations for the inputs in the given block of input time steps using a context subnetwork to determine a current context vector;

process the current context vector and the updated hidden state of the first RNN subnetwork using a second RNN subnetwork to update a current hidden state of the second RNN subnetwork; and process the current hidden state of the second RNN subnetwork using a softmax layer to generate a respective score for each output in a dictionary of possible outputs.

15. The system of claim 14, wherein the context subnetwork is an RNN.

16. The system of claim 9, wherein the input sequence is a speech sequence and the target sequence is a sequence of phonemes representing the speech sequence.

17. A computer storage medium encoded with instructions that, when executed by one or more computers, cause the one or more computers to perform operations for generating a target sequence comprising a respective output at each of a plurality of output time steps from an input sequence comprising a respective input at each of a plurality of input time steps, the operations comprising:

for each block of a fixed number of input time steps in the input sequence:

processing each input in the block of input time steps using an encoder recurrent neural network (RNN) to generate a respective feature representation of the input; and processing the feature representations for the inputs in the block and a preceding output at a preceding output time step using a transducer RNN to select a respective output for each of one or more output time steps immediately following the preceding output time step.

18. The computer storage medium of claim 17, wherein, for the initial block in the input sequence, the preceding output at the preceding output time step is a placeholder start-of-sequence output.

19. The computer storage medium of claim 17, wherein processing the feature representations for the inputs in the block and a preceding output at a preceding output time step using a transducer RNN to select a respective output for each of one or more output time steps immediately following the preceding output time step comprises selecting outputs until the selected output is a designated end-of-block output.

20. The computer storage medium of claim 17, wherein the transducer RNN is configured to, for a given block of input time steps and to select an output for a given output time step:

process the output at an output time step immediately preceding the given output time step and a preceding context vector for the output time step immediately preceding the given output time step using a first RNN subnetwork to update a current hidden state of the first RNN subnetwork;

process the updated hidden state of the first RNN subnetwork and the feature representations for the inputs in the given block of input time steps using a context subnetwork to determine a current context vector;

process the current context vector and the updated hidden state of the first RNN subnetwork using a second RNN subnetwork to update a current hidden state of the second RNN subnetwork; and process the current hidden state of the second RNN subnetwork using a softmax layer to generate a respective score for each output in a dictionary of possible outputs.

* * * * *